United States Patent
Subramaniam

(10) Patent No.: US 8,953,450 B2
(45) Date of Patent: Feb. 10, 2015

(54) METHOD AND SYSTEM FOR INGRESS MULTICAST LOAD BALANCING

(75) Inventor: Kamala Subramaniam, Sunnyvale, CA (US)

(73) Assignee: Alcatel Lucent, Boulogne-Billancourt (FR)

(*) Notice: Subject to any disclaimer, the term of this patent is extended or adjusted under 35 U.S.C. 154(b) by 15 days.

(21) Appl. No.: 13/495,046

(22) Filed: Jun. 13, 2012

(65) Prior Publication Data

US 2013/0336115 A1    Dec. 19, 2013

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl.
USPC .......................................................... 370/235

(58) Field of Classification Search
None
See application file for complete search history.

(56) References Cited

U.S. PATENT DOCUMENTS

| | | | |
|---|---|---|---|
| 6,510,162 B1 * | 1/2003 | Fijolek et al. ............... 370/432 |
| 7,606,154 B1 * | 10/2009 | Lee ............................ 370/232 |
| 8,341,266 B2 * | 12/2012 | Olariu et al. ............... 709/226 |
| 2010/0061234 A1 * | 3/2010 | Pai et al. ................. 370/230.1 |
| 2010/0061235 A1 * | 3/2010 | Pai et al. ................. 370/230.1 |
| 2010/0161797 A1 * | 6/2010 | Nandagopal et al. ....... 709/225 |
| 2010/0195530 A1 * | 8/2010 | Bitar ......................... 370/252 |
| 2012/0207012 A1 * | 8/2012 | Kompella .................. 370/216 |
| 2013/0088961 A1 * | 4/2013 | Ramachandran et al. .... 370/235 |

* cited by examiner

*Primary Examiner* — Suk Jin Kang
(74) *Attorney, Agent, or Firm* — Wall & Tong, LLP

(57) ABSTRACT

A system, method and apparatus for efficient bandwidth management of traffic across a plurality of channels using one or more epoch-based load balancing functions to asynchronously rebalance traffic allocations among the channels.

21 Claims, 6 Drawing Sheets

METHOD AND SYSTEM FOR INGRESS MULTICAST LOAD BALANCING

FIELD OF THE INVENTION

The invention relates to the field of communication networks and, more specifically, to efficient bandwidth management of traffic across multiple channels.

BACKGROUND

Routers are typically architected with a hierarchical buffer or traffic queue structure in which traffic or data flows passing through the router are buffered by various buffers or queues depending upon the input port from which the data flow is received, the output port to which the data is transmitted, and the switching element or elements (switching fabric) used to route the data between the input and output ports.

In view of above-described architecture, existing bandwidth (BW) management solutions do not adequately address changes in relative BW loading among channels traversing a router or other switching device. Traffic traversing individual channels or pipes may be shaped or otherwise processed by policer functions to enforce Peak Information Rate/Committed Information Rate (PIR/CIR) service levels. However, traffic across multiple channels is not managed in a sufficiently coherent function from a BW efficiency perspective.

SUMMARY

Various deficiencies in the prior art are addressed by systems, methods and apparatus for efficient bandwidth management of traffic across a plurality of channels using one or more epoch-based load balancing functions to asynchronously rebalance traffic allocations among the channels.

In one embodiment, a system comprises a router communicatively coupled to a network, the router including ingress ports for receiving data streams associated with one or more communication channels, egress ports to propagate traffic toward the network, and a processor configured to perform a plurality of bandwidth (BW) management functions to asynchronously rebalance traffic allocations among the channels by executing one or more epoch-based adaptive load balancing functions.

BRIEF DESCRIPTION OF THE DRAWING

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be primarily described within the context of particular embodiments; however, those skilled in the art and informed by the teachings herein will realize that the invention is also applicable to other technical areas and/or embodiments.

Generally speaking, the various embodiments enable, support and/or provide a management paradigm enabling efficient bandwidth utilization of traffic across multiple channels in a router, switching device or other data processing device/system. Various embodiments provide bandwidth (BW) management functions associated with conveying traffic via one or more multimedia communication channels, wherein the bandwidth management functions being adapted to asynchronously rebalance said traffic by executing an epoch-based load balancing function to thereby redistribute said rebalanced traffic.

Various embodiments described herein perform epoch-based load balancing functions between channels within a router by redistributing the streams among the channels per the criteria described below. The streams are rebalanced asynchronously with respect to an epoch timer in response to various trigger conditions (e.g., spike in traffic of a particular type or priority level, change in subscriber/provider policy and so on).

For example, given a static number of channels (X), each with a respective bandwidth capacity (Y), for serving a plurality of multicast streams, it is useful to maintain uniform distribution of the bandwidth used across the channels. The inability to properly balance the load across the channels will lead to a loss of multicast traffic. If the number of streams, the bandwidth utilized, the arrival rate and the service rate are known, then these streams can be pre-provisioned. The complexity arises from the dynamic nature of different kinds of Internet traffic and the associated Quality of Service (QoS); for example, voice, streaming (ex: video), interactive (ex: chat) and background (ex:ftp). These types of Internet traffic encompass but are not limited to the following issues; namely, (1) uniform vs. non-uniform arrival rates; (2) uniform vs. non-uniform service rates; (3) uniform vs. non-uniform bandwidth; and (3) continuous vs. time-based transmission.

In various embodiments, the incoming stream is processed according to a classification associated with above described characteristics.

Figure 1:
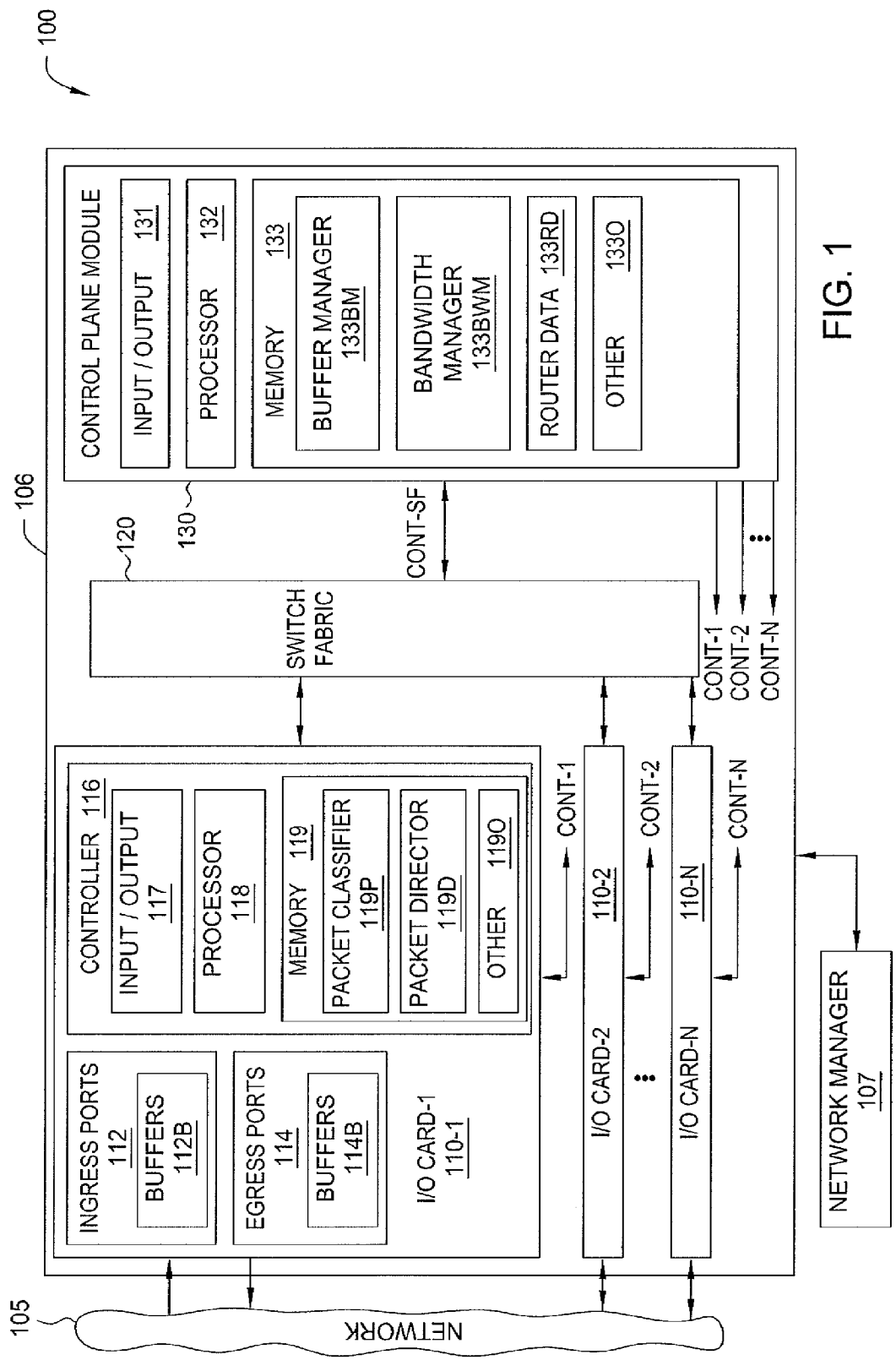
FIG. 1 depicts a high-level block diagram of an apparatus benefiting from embodiments.

FIG. 1 depicts a high-level block diagram of an apparatus benefiting from various embodiments. Specifically, FIG. 1 depicts a router 106 in communication with a network 105 and a network manager 107. Network 105 may be any type of network. In one embodiment, the network is an Internet Protocol (IP) network.

The router 106 includes a plurality of input output (I/O) cards 110-1, 110-2 and so on up to 110-N (collectively I/O cards 110), a switch fabric 120 and a control plane module 130. The control plane module 130 controls the operation of the I/O cards 110 and switch fabric 120 by respective control signals CONT.

Each of the I/O cards 110 includes a plurality of ingress ports 112 including corresponding ingress ports buffers 112B, a plurality of egress ports 114 including corresponding egress port buffers 114B, and a controller 116 including an I/O module 117, a processor 118 and memory 119. The memory 119 is depicted as including software modules, instantiated objects and the like to provide packet classifier 119P, packet director 119D and other functions 119O. The controller 116 may be implemented as a general purpose computing device or specific purpose computing device, such as described below with respect to FIG. 6.

The I/O cards 110 operate to convey packets between the network 105 and the switch fabric 120. Packets received at a particular ingress port 112 of an I/O card 110 may be conveyed to the switch fabric 120 or back to the network 105 via a particular egress port 112 of the I/O cards 110. Routing of packets via the I/O cards 110 is accomplished in a standard manner according to routing data provided by the control plane module 130, which may be stored in the routing data portion of memory 119.

The switch fabric 120 may comprise any standard switch fabric such as electrical, optical, electro-optical, MEMS and the like.

The control plane module 130 receives from a network manager 107 configuration data, routing data, policy information, policer information, and other information pertaining to various management functions. The control plane module 130 provides management and operations data to the network manager 107, including data such as configuration data, status data, alarm data, performance data and the like.

The control plane module 130 comprises an I/O module 131, a processor 132 and memory 133. The memory 133 is depicted as including software modules, instantiated objects and the like to provide a buffer manager 133BM, a BW manager 133BWM, routing data 133RD and other functions 133O. The control plane module 130 may be implemented as a general purpose computing device or specific purpose computing device, such as described below with respect to FIG. 6.

The buffer manager 133BM operates to manage the configuration of the various policers such that they conform to the buffer structure provided by, illustratively, ingress ports, egress ports, switch fabric and so on. The buffer manager 133 BM also interacts with the various buffers to determine whether soft or hard limits have been reached, such as an overutilization warning limit (e.g., 80% of buffer utilization level), an overutilization alarm limit (e.g., 95% of buffer utilization level) and so on of the buffers operative within the context of router 106.

The BWM manager 133BWM operates to define and manage the various BW management functions. The BWM manager 133BWM communicates the number, type, operating parameters and/or other characteristics of policers to be instantiated within the context of the router 106. The BWM manager 133BWM operates to process traffic classification constraints, subscriber/user constraints and, generally, any other BW management related parameter impacting the number, type, operating parameters and/or other characteristics of the BW management functions to be instantiated within the context of the router 106.

The routing data 133RD operates to process routing information such that packets or traffic flows received at ingress ports are routed to appropriate egress ports within the context of the router 106. The routing data 133RD may include routing tables, protection or fault recovery information and so on.

Figure 2:
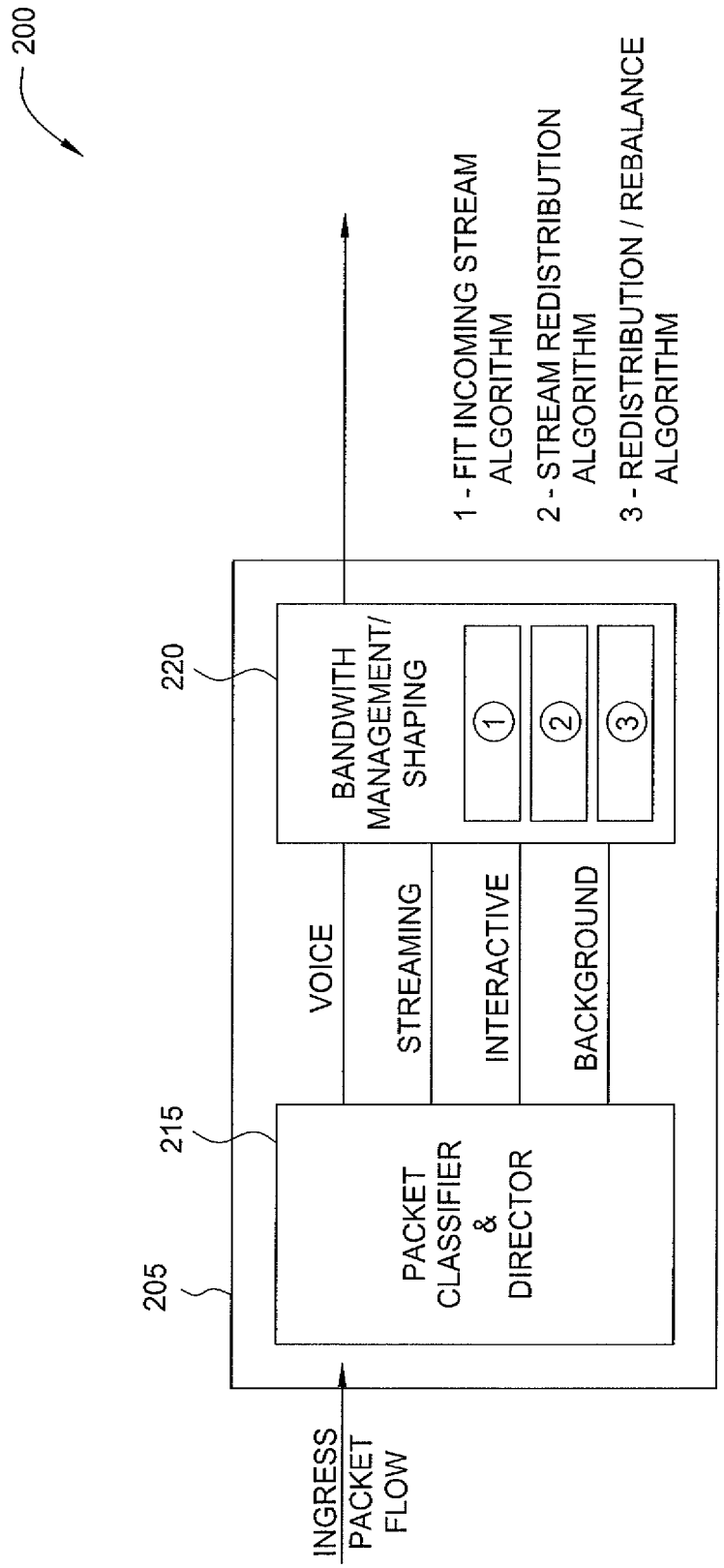
FIG. 2 depicts a high-level block diagram of a network element portion according to one embodiment.

FIG. 2 depicts a high-level block diagram of a network element portion 200 according to one embodiment. For example, the network element portion 200 of FIG. 2 may be implemented within the context of an ingress card, control cards or other element within a packet routing or switching system. The network element portion 200 may be used to ensure that only those packets corresponding to one or more specific parameters are coupled to a switching fabric for subsequent routing to a destination.

A packet classifier and director 215 receives an ingress packet flow and responsively classifies the packets according to, illustratively, video, voice, data or other classifications. The packets may also be classified according to a subscriber, source or destination associated with the packet. Various classification parameters may be obtained using profile information, service level agreement (SLA) information and so on. Packet classifier and director 210 routes streams of classified packets to bandwidth management/shaping module 220. The packet classifier and director 215 may be an instantiated function within the memory 119 of the I/O card 110 discussed above with respect to FIG. 1.

Bandwidth management/shaping module 220 implements BW management functions according to various embodiments. In one embodiment, a "fit incoming stream test" or "fit test" is implemented using the BW management/shaping module 220.

The fit test is adapted to identify those channels having sufficient bandwidth to accommodate the incoming stream. As discussed in more detail below, the appropriate channel to convey traffic from incoming stream may comprise a channel supporting little or no traffic at present (e.g., an unused channel). The appropriate channel may also comprise a relatively well utilized channel wherein inclusion of the incoming stream brings the utilization level of the channel above a threshold level of utilization (e.g., a target or desired utilization level).

The packet classifier and director 230 and the BW management/shaping module 220 may be implemented in an environment 205 comprising hardware, software or combination thereof.

Figure 3:
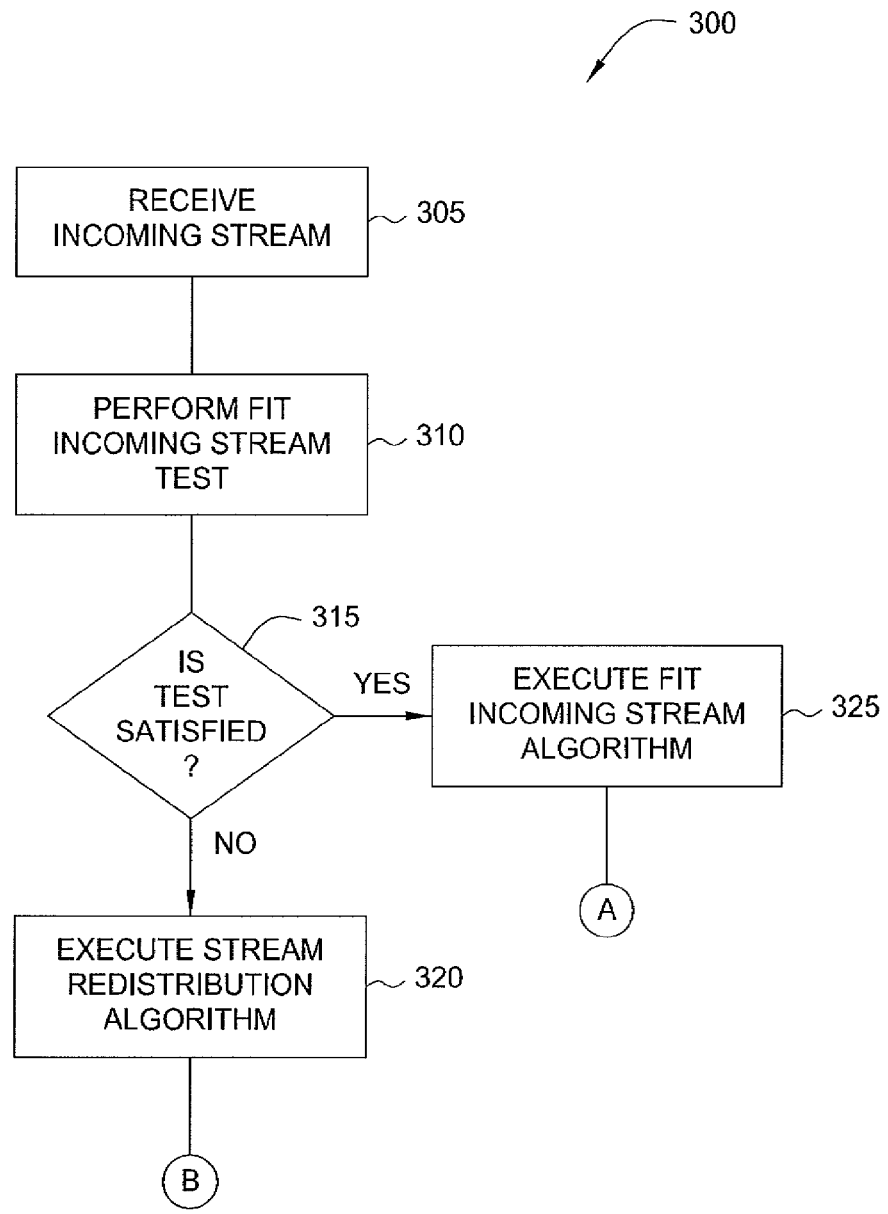
FIG. 3 depicts a flow diagram of a method according to one embodiment and suitable for use in the network element portion of FIG. 2.

FIG. 3 depicts a flow diagram of a method according to one embodiment suitable for use in, illustratively, the network element portion of FIG. 2. Specifically, FIG. 3 depicts a flow diagram of a bandwidth management method according to one embodiment.

At step 305, an incoming multimedia or other type of data stream is received. At step 310, a "fit incoming stream test" is performed to identify an appropriate channel to convey the incoming data stream. At step 315, a determination is made as to whether the "fit test" has yielded a satisfactory result. If a satisfactory test result has been obtained, then at step 325 a "fit incoming stream" algorithm is executed, such as described below with respect to FIG. 4. If a satisfactory test result has not been obtained, then at step 328 stream redistribution algorithm is executed, such as described below with respect to FIG. 5.

Figure 4:
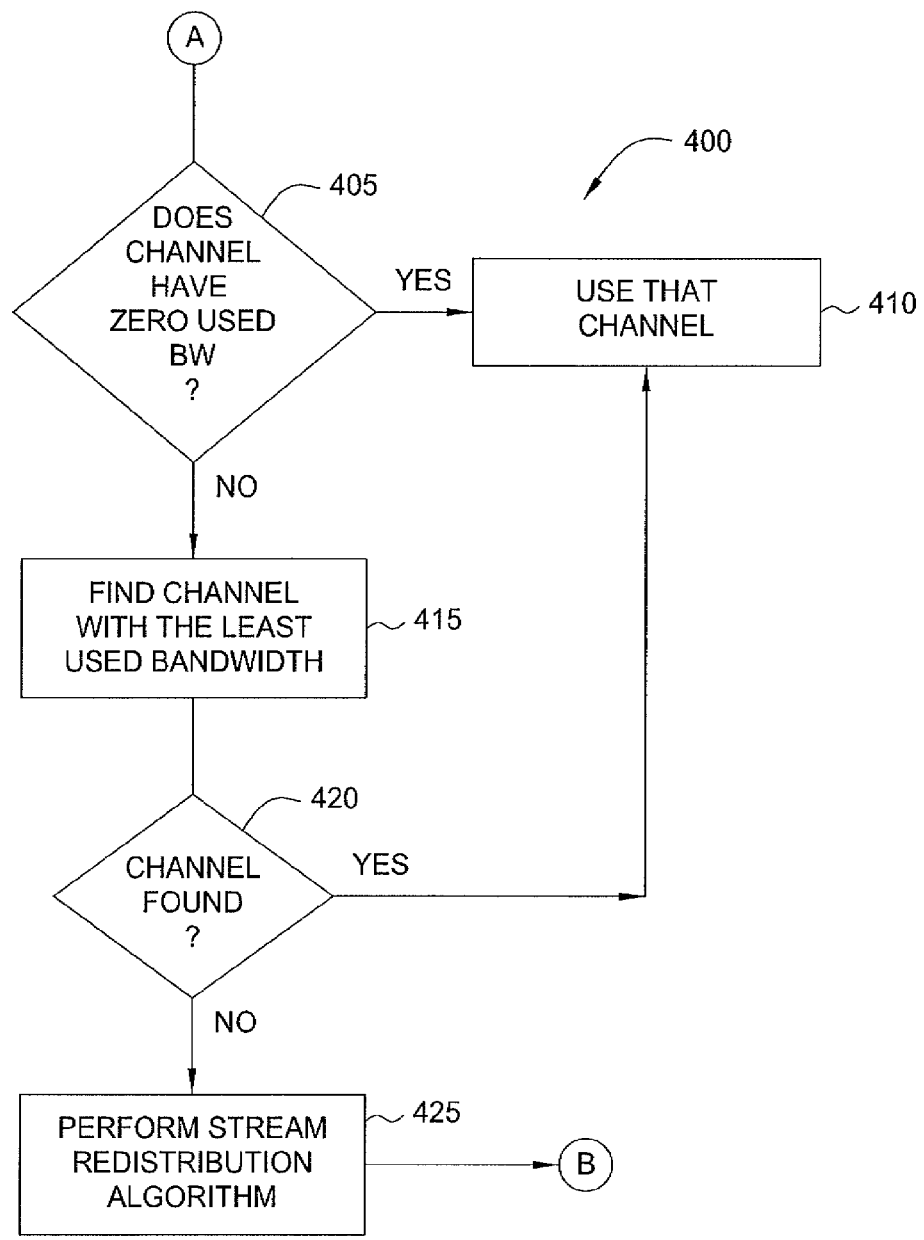
FIG. 4 depicts a flow diagram of a method according to one embodiment and suitable for use in the network element portion of FIG. 2.

FIG. 4 depicts a flow diagram of a method according to one embodiment suitable for use in the network element portion described above with respect to FIG. 2. Specifically, FIG. 4 depicts a flow diagram of a fit incoming stream method or algorithm 400 suitable for use with the bandwidth management method described above with respect to FIG. 3. The fit incoming stream method or algorithm is adapted to find or identify a "best" or preferred fit as opposed to a first fit for the incoming streams.

In various embodiments, a management goal is to distribute bandwidth loading across the various channels as evenly as possible, such as described herein with respect to FIG. 4. For example, if a channel is utilizing little or no bandwidth, then incoming traffic is directed to that channel. In another embodiment, incoming traffic is directed to the channel with the least used bandwidth.

In various other embodiments, a management goal is to maximize the bandwidth utilization of fewer channels, such as by directing coming traffic to various channels until desired bandwidth utilization levels of the channels achieved.

In various embodiments some channels have higher preferred or desired bandwidth utilization levels than those of other channels. In another embodiment, incoming traffic is directed to the channel having bandwidth minimally sufficient to accommodate the incoming traffic.

At step 405, a determination is made as to whether a channel exhibits a zero (or minimal) bandwidth utilization level. If little or no bandwidth is used by the channel (e.g., the channel is idle), then at step 410 the channel is selected for use in carrying the incoming flow diagram of a stream.

At step 415, the method operates to find the channel with the least used bandwidth (i.e., the lowest bandwidth utilization level).

At step 410, a determination is made as to whether the channel having the lowest bandwidth utilization level that identified. If so, then at step 410 the channel is selected for use in carrying the incoming flow diagram of a stream. If not, then at step 425 a stream redistribution method or algorithm is executed.

Various embodiments provide hardware BW management; others use hardware and software to make the management adaptive with regards to various policies, priorities and so on.

Figure 5:
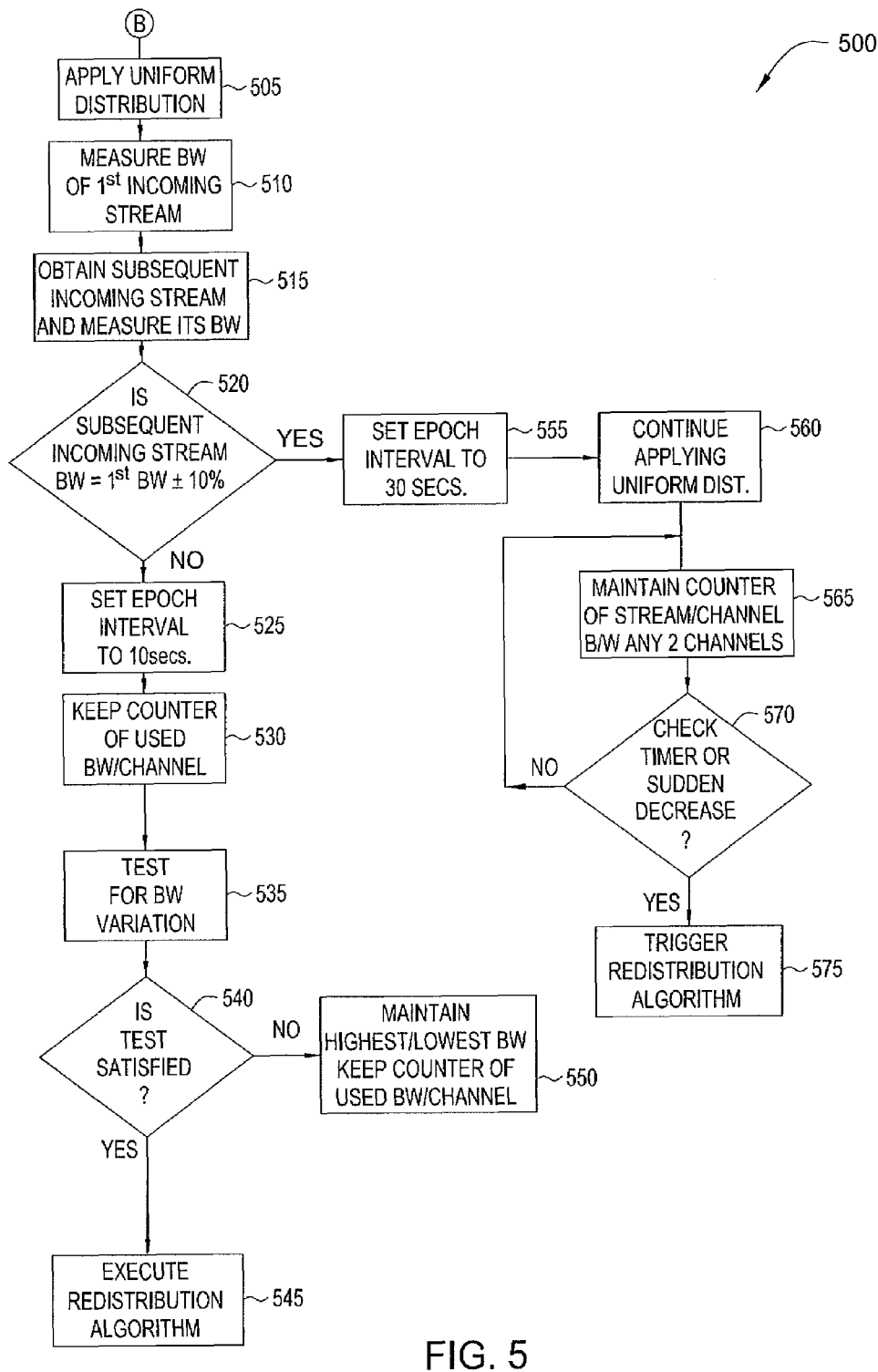
FIG. 5 depicts a flow diagram of a method according to one embodiment and suitable for use in the network element portion of FIG. 2.

FIG. 5 depicts a flow diagram of a method according to one embodiment suitable for use in the network element portion described above with respect to FIG. 2. Specifically, FIG. 5 depicts a flow diagram of a stream redistribution method or algorithm 500 suitable for use with the bandwidth management method described above with respect to FIG. 3 The stream redistribution comprises two major categories; namely, uniform distribution and non-uniform distribution.

At step 505, a uniform bandwidth distribution is applied to the incoming traffic stream until such time as conditions warrant otherwise. At this point, the first incoming stream is identified and designated as such.

At step 510, the bandwidth requirement of the first incoming stream is measured and stored.

At step 515, a subsequent incoming stream is obtained and the bandwidth requirement of the subsequent incoming stream is determined and stored. In one embodiment, the bandwidth of the subsequent stream is compared to an arbitrary number. In another embodiment, the bandwidth of the subsequent stream is compared to a measured bandwidth of the first incoming stream.

At step 520, a determination is made as to whether the subsequent incoming stream bandwidth requirement is equal to the first incoming stream bandwidth requirements (plus or minus a hysteresis value). If so, then a uniform bandwidth distribution is maintained. In one embodiment, the hysteresis parameter is ±10%, though smaller or larger hysteresis parameters may be used. Further, positive and negative hysteresis parameters may be of different sizes. In another embodiment, the hysteresis parameter is dynamically determined based on load, service level agreement (SLA) and or other factors.

In one embodiment, if the bandwidth of the incoming stream is not within a hysteresis parameter, then non-uniform bandwidth distribution is invoked, such as described in more detail below with respect to steps 525-550. In another embodiment, a hybrid bandwidth distribution is implemented. The hybrid bandwidth distribution combines uniform and non-uniform distribution to achieve optimum load balancing.

If the determination at step 520 indicates that the bandwidth requirements of the two incoming streams are sufficiently similar, then at step 555 the epoch interval is set to a relatively high predefined value (e.g., 30 seconds), and the method 500 proceeds to step 550 for continued processing within the context of uniform distribution embodiments. Otherwise, at step 525 the epoch interval is set to a relatively low predefined value (e.g., 10 seconds), and the method 500 receives to step 530 for continued processing within the context of non-uniform distribution embodiments.

It is noted that for the non-uniform distribution embodiments, huge variations in the relative bandwidth requirements of data streams can lead to quick loss of multicast traffic and, therefore, the epoch interval is set to a relatively low predefined value. In various embodiments, the epoch interval may be dynamically determined in response to conditions, configurations and the like.

At step 530, a counter of utilized bandwidth per channel is maintained. In one embodiment, the highest and lowest bandwidth of all streams are monitored and recorded. In another embodiment, the highest and lowest bandwidth of all streams are monitored and recorded for a specific period of time.

At step 535, the counter is evaluated (i.e., bandwidth utilized per channel is analyzed) to test if bandwidth variation exceeds a desired level, and at step 540 a determination is made as to whether the bandwidth variation test has been satisfied. If satisfied (i.e., too much variation in bandwidth utilization levels), then the method 500 proceeds to step 545. Otherwise, the method 500 proceeds to step 550.

At step 545, a redistribution algorithm is triggered if a bandwidth variation of one or more streams is greater than a predefined aloud or lowest variation (± a lowest bandwidth variation) and the method 500 exits. In another embodiment, the variation in bandwidth enough to trigger the redistribution algorithm is dynamically determined. In another embodiment, the redistribution algorithm is triggered, illustratively, the escalator is you I'm not yes every 10 seconds using step 520 as a reference point for timing purposes. In another embodiment, the time interval to trigger the redistribution algorithm is dynamically determined.

Generally speaking, the redistribution algorithm is triggered if a bandwidth variation of one or more streams is greater than ± the stream with the lowest bandwidth. The number of streams meeting this criterion is evaluated. In one embodiment, if the difference in the number of streams is greater than, illustratively, two, the stream with the lowest bandwidth is moved out first and the algorithm is iterated. In another embodiment, the difference in the number of streams is assigned dynamically.

At step 550, the counter of utilized bandwidth, which was used per channel initialized in step 530 is maintained and the method 500 exits. In one embodiment, the highest and lowest bandwidth of all streams are monitored and recorded. In another embodiment, the highest and lowest bandwidth of all streams are monitored and recorded for a specific period of time.

As indicated above, a relatively long epoch interval is set at step 555 in response to the first and subsequent streams having sufficiently similar bandwidth requirements.

At step 560, the method 500 continues applying a uniform distribution of streams to the various channels as previously discussed. In the illustrated embodiment, the epoch interval is set to a relatively large time period such as 30 seconds at step 555. It will be appreciated that this epoch interval may be set to values greater than 30 seconds or less than 30 seconds. This interval may be greater than that of non-uniform distribution embodiment due to reduced variations in channel bandwidths utilized. Therefore, the computation intensity may be reduced. In various embodiments, the epoch interval is dynamically adjusted. In various embodiments, the redistribution algorithm is triggered when a sudden decrease in streams that is not due to de-configuration is detected.

At step 565, the number of streams across all the channels is counted and an average number is determined and maintained by, illustratively, a counter. Generally speaking, if a channel has more than an average or preferred number of streams, then that channel is depopulated (i.e., streams reallocated and the like) until the number of streams for that channel reaches the average or preferred number. The channel being depopulated is designated as such so that no additional streams are allocated to that channel. In this manner, stream count is reduced at overpopulated channels and increased at underpopulated channels until load balance across the channel is achieved.

At step 570, a determination is made as to whether the epoch timer has expired or a sudden decrease in available channel bandwidth is experienced. If the epoch timer has not expired and available channel bandwidth is not dropped precipitously, then step 565 is repeated. A sudden decrease in available channel bandwidth may be defined in terms of a additional hysteresis level, a predefined reduction or loss in available bandwidth over a predefined time period and so on. Generally speaking, a sudden or precipitous decrease in channel bandwidth availability may be defined in terms of a rate at which available bandwidth is decreasing and/or and actual reduction in available bandwidth noted within a predefined period of time.

At step 575, a redistribution algorithm is triggered a response to either of an expiration of the epoch counter or sudden decrease in available channel bandwidth.

A populated channel is designated such that no stream would be added to that channel. This process continues until the load is balanced across the channels.

The various embodiments described herein contemplate systems, methods and apparatus performing some or all of the following steps:

1. Fit each incoming data stream; that is, find a "best fit" channel for an incoming data stream rather than a "first available fit" channel for the incoming stream.

2. Identify the nature of the stream; that is, assume uniform bandwidth distribution at a starting time unless incoming streams give are such that non-uniform bandwidth processing may be more appropriate, such as due to vastly different bandwidth requirements and the like.

3. Identify an appropriate epoch interval for load-balancing. For example, in a uniform bandwidth distribution having reduced stream to stream bandwidth variations, computational intensity may be reduced by increasing epoch intervals to relatively longer time periods (e.g., 20 seconds, 30 second, 40 seconds and so on). By contrast, a non-uniform bandwidth distribution having increased stream to stream bandwidth variations may benefit from reducing epoch intervals to relatively shorter time periods (e.g., 5 seconds, 10 second, 15 seconds and so on). In various embodiments, the actual epoch selected is empirically derived using, illustratively, resource availability, resource requirements, system congestion and packet loss indicators, allowable data loss or Quality of Experience (QoE) levels such as defined by Service Level Agreement (SLA), industry standards/customs and so on.

4. Identify the load balancing criteria. For example, in the case of some uniform data streams, a counter is maintained of streams per pipe/channel that do not differ greater than two between any two pipes/channels. Redistribution is triggered according to an elapsed time period, a change in the number of streams or some other criteria indicative of a potential imbalance in inefficient distribution of streams (e.g., criteria based, count based etc.). Similarly, in the case of some non-uniform streams, a counter is maintained of used bandwidth per pipe/channel and, optionally, a highest/lowest stream bandwidth for each pipe/channel. Redistribution is triggered according to a predefined time period, a difference between highest/lowest stream bandwidths exceeding a threshold level and so on.

5. Redistribution of the streams. For example, in the case of uniform streams, a counter may be used to count the number of streams across all pipes/channels and get an average number of streams per pipe/channel. If a pipe/channel exceeds the average (optionally plus or minus some hysteresis amount), then streams may be moved from that pipe/channel towards other pipes/channels until the average number is approached by the pipe/channel (i.e., average streams plus or minus a hysteresis factor of, illustratively, 5%, 10%, 15% or other value). In the case of non-uniform streams, a variation in the used bandwidth across the pipes/channels may be determined. If the variation in used bandwidth of a pipe/channel is greater than that of the pipe/channel with the lowest bandwidth utilization (optionally plus or minus some hysteresis amount), then the number of streams is examined and, if greater than two (or three, four or some other number), the stream with the lowest bandwidth is moved out of the pipe/channel. Streams may be actively moved from a pipe/channel, or new streams simply not added to a pipe/channel, or some combination thereof.

Figure 6:
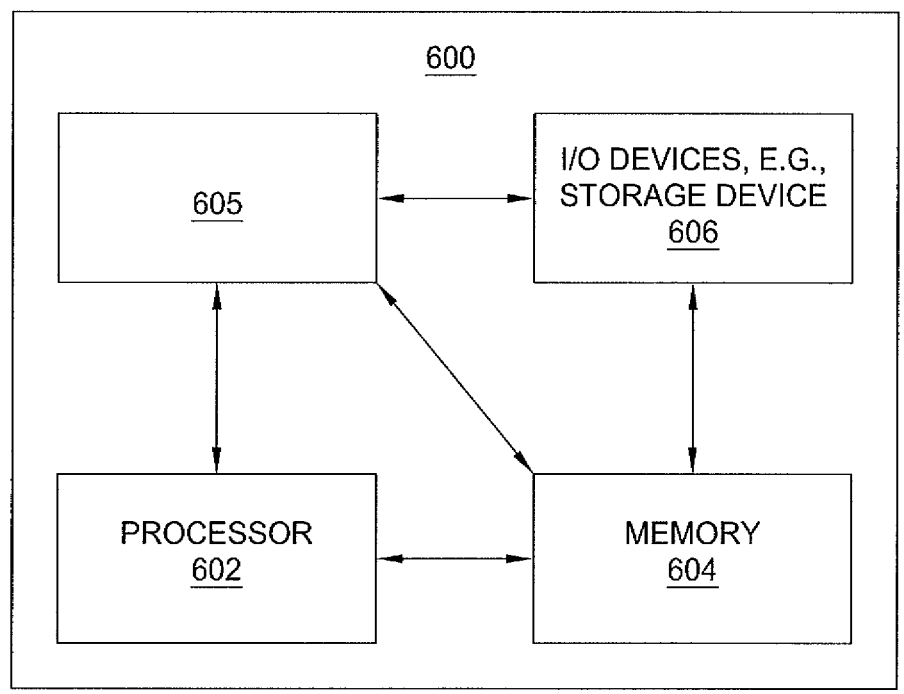
FIG. 6 depicts a high-level block diagram of a general-purpose computer suitable for use in performing various functions described herein.

FIG. 6 depicts a high-level block diagram of a general purpose computer suitable for use in performing the functions described herein. As depicted in FIG. 6, system 600 comprises a processor element 602 (e.g., a CPU), a memory 604, e.g., random access memory (RAM) and/or read only memory (ROM), a packet processing module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It will be appreciated that computer 600 depicted in FIG. 6 provides a general architecture and functionality suitable for implementing functional elements described herein and/or portions of functional elements described herein. Functions depicted and described herein may be implemented in software and/or hardware, e.g., using a general purpose computer, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via tangible media and/or stored within a memory within a computing device operating according to the instructions.

Generally speaking, the various embodiments described above address inefficiencies in bandwidth management through epoch-based load balancing of incoming multimedia streams. The various embodiments described herein find particular utility within the context of network switches or routers in which ingress buffers, switch fabric buffers, egress buffers and the like are arranged in a hierarchical fashion and managed using bandwidth management/shaping instantiated in response to incoming traffic parameter or service information, such as provided via a service level agreement (SLA) or via a network operator management or control function.

Thus, the traffic distribution of input buffers, switch fabric buffers and/or output port buffers are adapted by a bandwidth management/shaping algorithm. Other embodiments and applications are also contemplated by the inventor.

Although various embodiments which incorporate the teachings of the present invention have been shown and described in detail herein, those skilled in the art can readily devise many other varied embodiments that still incorporate these teachings.

What is claimed is:

1. Apparatus, comprising:
a plurality of ingress ports for receiving respective ingress packet flows, each ingress packet flow comprising one or more data streams;
a plurality of communication channels, for routing received data streams toward respective egress ports, each of said communication channels having a respective bandwidth capacity; and
a bandwidth management module, for configuring policers in conformance with a buffer structure defined by buffers of ingress ports, egress ports and switch fabric supporting the plurality of communication channels, and for redistributing data streams according to load balancing criteria upon the expiration of each of a sequence of epoch intervals, said epoch intervals having a duration selected in response to bandwidth characteristics of received data streams.

2. The apparatus of claim 1, wherein said data streams are redistributed according to a uniform bandwidth distribution in response to variations of bandwidth characteristics of received data streams being within a predefined level.

3. The apparatus of claim 2, wherein said predefined level is defined as a predefined percentage difference from an initial received data stream.

4. The apparatus of claim 2, wherein said predefined level is defined as a predefined percentage difference between bandwidth characteristics of a first data stream and subsequent data streams.

5. The apparatus of claim 1, wherein said load balancing criteria comprises a difference in respective numbers of data streams carried by each of two communication channels exceeding a predetermined number.

6. The apparatus of claim 5, wherein said two communication channels comprise a communication channel carrying a highest number of data streams and a communication channel carrying a lowest number of data streams.

7. The apparatus of claim 1, wherein said load balancing criteria comprises a difference in respective bandwidth utilization level of two communication channels exceeding a predetermined amount.

8. The apparatus of claim 7, wherein said two communication channels comprise a communication channel associated with a highest bandwidth utilization level and a communication channel associated with a lowest bandwidth utilization level.

9. The apparatus of claim 1, wherein said epoch interval is empirically derived using one or more of resource availability, resource requirements, system congestion, packet loss indication, allowable data loss and Quality of Experience (QoE) level.

10. The apparatus of claim 1, wherein said bandwidth management module redistribute data streams among said plurality of communication channels in response to said fit test failing to identify a communication channel having sufficient bandwidth to accommodate said received data stream.

11. A method, comprising:
receiving a plurality of ingress packet flows via one or more ingress ports, each ingress packet flow comprising one or more data streams;
identifying, for each received data stream, one or more of a plurality of communication channels having sufficient bandwidth to route the received data stream toward a respective egress port, said plurality of communication channels having bandwidth characteristics defined via respective policers, said policers configured in conformance with a buffer structure defined by buffers of ingress ports, egress ports and switch fabric supporting the plurality of communication channels;
selecting, for each received data stream, a respective identified communication channel to route the received data stream toward a respective egress port; and
redistributing data streams among communication channels according to load balancing criteria upon the expiration of each of a sequence of epoch intervals, said epoch intervals having a duration selected in response to received data stream bandwidth characteristics.

12. The method of claim 11, wherein said data streams are redistributed according to a uniform bandwidth distribution in response to variations of bandwidth characteristics of received data streams being within a predefined level.

13. The method of claim 12, wherein said predefined level is defined as a predefined percentage difference from an initial received data stream.

14. The method of claim 12, wherein said predefined level is defined as a predefined percentage difference between bandwidth characteristics of a first data stream and subsequent data streams.

15. The method of claim 11, wherein said load balancing criteria comprises a difference in respective numbers of data streams carried by each of two communication channels exceeding a predetermined number.

16. The method of claim 15, wherein said two communication channels comprise a communication channel carrying a highest number of data streams and a communication channel carrying a lowest number of data streams.

17. The method of claim 11, wherein said load balancing criteria comprises a difference in respective bandwidth utilization level of two communication channels exceeding a predetermined amount.

18. The method of claim 17, wherein said two communication channels comprise a communication channel associated with a highest bandwidth utilization level and a communication channel associated with a lowest bandwidth utilization level.

19. The method of claim 11, wherein said selected communication channel comprises an underutilized communication channel having associated with it a target utilization level, wherein inclusion of said received data stream within said selected communication channel will increase the utilization level of said selected communication channel to release said target utilization level.

20. A non-transitory computer readable medium including software instructions which, when executed by a processer, perform a method, comprising:
receiving a plurality of ingress packet flows via one or more ingress ports, each ingress packet flow comprising one or more data streams;
identifying, for each received data stream, one or more of a plurality of communication channels having sufficient bandwidth to route the received data stream toward a respective egress port, said plurality of communication channels having bandwidth characteristics defined via respective policers, said policers configured in conformance with a buffer structure defined by buffers of ingress ports, egress ports and switch fabric supporting the plurality of communication channels;

selecting, for each received data stream, a respective identified communication channel to route the received data stream toward a respective egress port; and redistributing data streams among communication channels according to load balancing criteria upon the expiration of each of a sequence of epoch intervals, said epoch intervals having a duration selected in response to received data stream bandwidth characteristics.

21. A non-transitory computer program product, wherein a computer is operative to process software instructions which adapt the operation of the computer such that the computer performs a method, comprising:

receiving a plurality of ingress packet flows via one or more ingress ports, each ingress packet flow comprising one or more data streams;

identifying, for each received data stream, one or more of a plurality of communication channels having sufficient bandwidth to route the received data stream toward a respective egress port, said plurality of communication channels having bandwidth characteristics defined via respective policers, said policers configured in conformance with a buffer structure defined by buffers of ingress ports, egress ports and switch fabric supporting the plurality of communication channels;

selecting, for each received data stream, a respective identified communication channel to route the received data stream toward a respective egress port; and redistributing data streams among communication channels according to load balancing criteria upon the expiration of each of a sequence of epoch intervals, said epoch intervals having a duration selected in response to received data stream bandwidth characteristics.

* * * * *